(12) United States Patent
Saar et al.

(10) Patent No.: US 12,539,388 B2
(45) Date of Patent: Feb. 3, 2026

(54) LUBRICIOUS LINER IN CATHETER TUBE

(71) Applicant: Bendit Technologies Ltd., Petach Tikva (IL)

(72) Inventors: Bar Saar, Yashresh (IL); Reuven Filman, Tel Mond (IL); Oz Cabiri, Hod HaSharon (IL)

(73) Assignee: Bendit Technologies Ltd., Petach Tikva (IL)

( * ) Notice: Subject to any disclaimer, the term of this patent is extended or adjusted under 35 U.S.C. 154(b) by 141 days.

(21) Appl. No.: 18/419,814

(22) Filed: Jan. 23, 2024

(65) Prior Publication Data
US 2024/0374864 A1 Nov. 14, 2024

Related U.S. Application Data

(60) Provisional application No. 63/501,176, filed on May 10, 2023.

(51) Int. Cl.
*A61M 25/00* (2006.01)
(52) U.S. Cl.
CPC .... *A61M 25/0009* (2013.01); *A61M 25/0045* (2013.01); *A61M 2025/0046* (2013.01); *A61M 2207/00* (2013.01)
(58) Field of Classification Search
CPC ... B29C 63/0069; B29C 63/341; B29C 63/20; A61M 25/0009; A61M 25/0045; A61M 2025/0047; A61M 2025/0046; A61M 2207/00; B29L 2031/7542
See application file for complete search history.

(56) References Cited

U.S. PATENT DOCUMENTS

| 5,906,605 A | * | 5/1999 | Coxum | A61M 25/005 600/374 |
| 2008/0125707 A1 | * | 5/2008 | Wilson | A61M 25/10 264/542 |

FOREIGN PATENT DOCUMENTS

| EP | 0089379 | 9/1983 |
| EP | 2815870 | 9/2019 |

OTHER PUBLICATIONS

PCT Search Report and Written Opinion PCT/IB2024/054372, Sep. 27, 2024.

* cited by examiner

*Primary Examiner* — Monica A Huson
(74) *Attorney, Agent, or Firm* — Dekel Patent Ltd.; David Klein

(57) ABSTRACT

A method for assembling a liner in a tube includes placing a liner in a tube, and heating a portion of the liner, called a heated portion, with a local heat source. The heated portion is not more than a third of a total length of the liner. The heated portion is expanded radially outwards so that the heated portion abuts against an inner wall of the tube. The local heat source is repeatedly advanced longitudinally along a desired length of the liner to expand the heated portion radially outwards so that the heated portion abuts against the inner wall of the tube for the desired length.

11 Claims, 1 Drawing Sheet

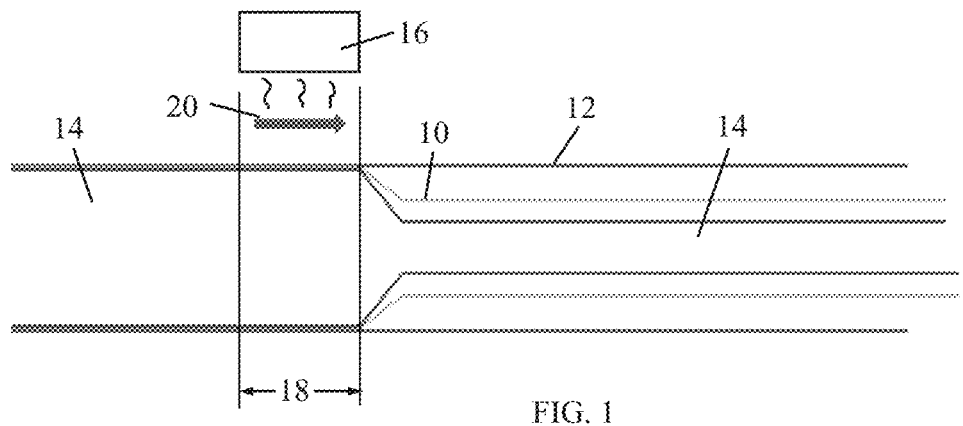
FIG. 1
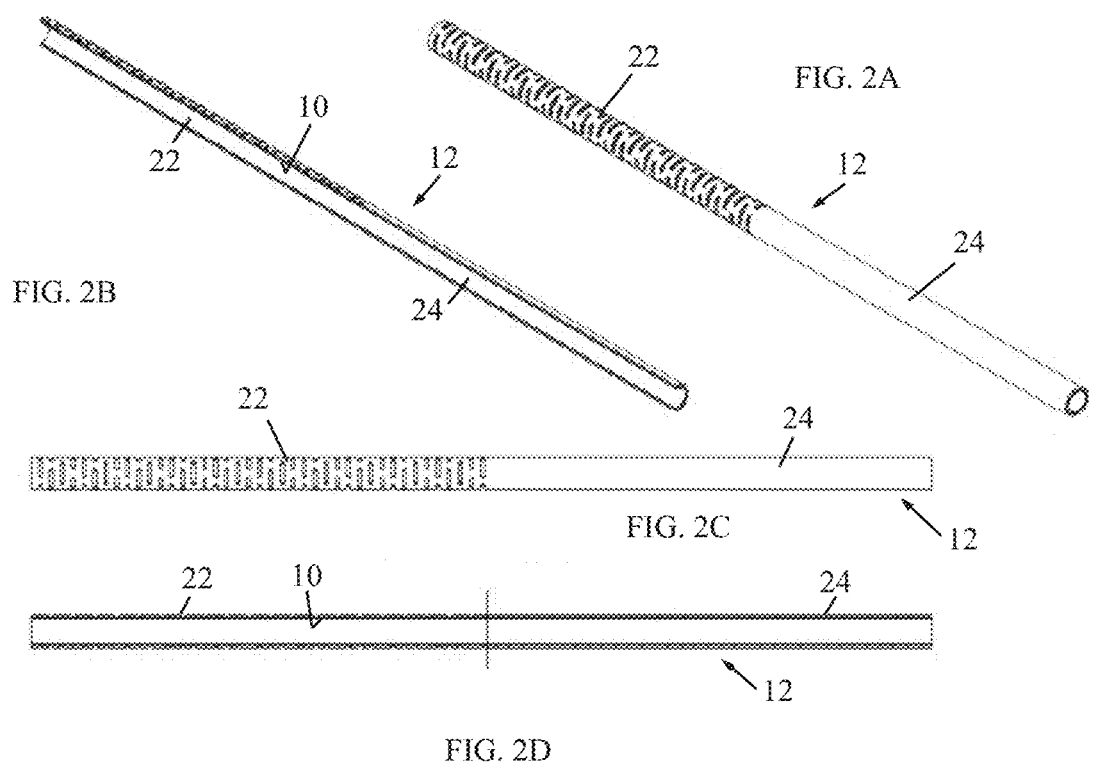

LUBRICIOUS LINER IN CATHETER TUBE

FIELD OF THE INVENTION

The present invention relates to lubricious liners used in catheter tubes for reducing friction and facilitating sliding an object in the tube, and particularly to expanding or joining the lubricious liner to the inner wall of the tube.

BACKGROUND OF THE INVENTION

There are many surgical or medical procedures, in which an object, such as a wire, a stent, a needle, a surgical tool, an embolic capture mesh, etc., must slide in or through a lumen of a catheter or tube (the terms being used interchangeably). It may be difficult to push the object through the lumen due to friction forces between the object and the inner wall of the catheter, especially if there are bends in the catheter when negotiating certain vasculature.

It is known in the art to reduce the friction by inserting into the catheter a liner made of a lubricious material, for example, a fluorocarbon such as polytetrafluoroethylene (PTFE), to provide a low-friction surface to allow easier sliding of the object through the catheter.

However, due to the non-stick properties of the lubricious liner, it is challenging to join the lubricious liner to the inner wall of the catheter. Therefore, prior art liners are either joined at one or more points of the tube while the rest of the liner is free and floating, or the liner is completely floating in the tube.

Because the liner is floating inside the tube (either partially or fully), and due to assembly constraints, the liner outer diameter (OD) is smaller than the tube inner diameter (ID). This results in a small contact area between the liner and the tube, and allows movement of the liner which can cause the liner to stretch.

SUMMARY

The present invention seeks to provide an innovative method for expanding a lubricious liner radially outwards to an inner wall of a catheter or tube, and as an additional option joining the liner to the tube, as is described more in detail hereinbelow.

In one non-limiting embodiment of the present invention, one portion of the liner is expanded against the inner wall of the tube without joining the tube to the liner, and another portion of the liner is expanded against the inner wall of the tube and joined to the tube. For example, it may be advantageous that the liner is not joined to the tube where there are slots or other cuts in the tube so the tube can bend in different directions, as opposed to an uncut portion of the tube where the liner is joined to the tube. Optionally, the liner can be joined to the cut portion of the tube, if desired.

Even where the liner is not joined to the tube, since the liner is expanded and pressed against the tube, the liner OD is the same as the tube ID, thereby creating a large contact area between the liner and the tube, which diminishes or eliminates stretching of the liner.

There is provided in accordance with a non-limiting embodiment of the invention, a method for assembling a liner in a tube including placing a liner in a tube, heating a portion of the liner, called a heated portion, with a local heat source, the heated portion being not more than a third of a total length of the liner, expanding the heated portion radially outwards so that the heated portion abuts against an inner wall of the tube, and repeatedly advancing the local heat source longitudinally along a desired length of the liner and expanding the heated portion radially outwards so that the heated portion abuts against the inner wall of the tube for the desired length.

In accordance with a non-limiting embodiment of the invention the liner is made of a lubricious material.

In accordance with a non-limiting embodiment of the invention the step of expanding is done by using a solid expander introduced into the liner.

In accordance with a non-limiting embodiment of the invention the step of expanding is done by using a liquid expander.

In accordance with a non-limiting embodiment of the invention the step of expanding is done by using a gas expander.

In accordance with a non-limiting embodiment of the invention a temperature to which the liner is heated is a temperature which softens the liner, but is lower than a melting point of the tube.

In accordance with a non-limiting embodiment of the invention a portion of the liner, called a non-joined expanded portion, is expanded against the inner wall of the tube without joining the tube to the liner.

In accordance with a non-limiting embodiment of the invention a portion of the liner, called a joined expanded portion, is expanded against the inner wall of the tube and the tube is joined to the liner.

In accordance with a non-limiting embodiment of the invention the tube is joined to the liner by heating the tube to a temperature above a melting point of the liner.

In accordance with a non-limiting embodiment of the invention the non-joined expanded portion is where there are slots or other cuts in the tube and the joined expanded portion is an uncut portion of the tube.

BRIEF DESCRIPTION OF DRAWINGS

The present invention will be understood and appreciated more fully from the following detailed description, taken in conjunction with the drawings in which:

FIG. 1 is a simplified illustration of gradually heating and expanding a lubricious liner along an axial length of the liner and pressing the liner against an inner wall of a tube, in accordance with a non-limiting embodiment of the present invention.

FIGS. 2A, 2B, 2C, and 2D are respectively perspective, perspective cutaway, front and front sectional views of a tube with the lubricious liner assembled therein, wherein one portion of the liner is expanded against the inner wall of the tube without joining the tube to the liner, and another portion of the liner is expanded against the inner wall of the tube and joined to the tube.

DETAILED DESCRIPTION

Reference is now made to FIG. 1. It is desired to assemble a lubricious liner 10 in a tube 12. Liner 10 may be made of a lubricious material, such as but not limited to, a fluorocarbon such as polytetrafluoroethylene (PTFE). Tube 12 may be made of a metal or polymer, such as but not limited to, stainless steel, nitinol, titanium alloy, nylon, polyether block amide (PEBA), and other materials. Examples of PEBA include the tradenames PEBAX (from Arkema) and VESTAMID (from Evonik Industries). Liner 10 initially has an OD smaller than the ID of tube 12.

Tube 12 can be an outer layer of a tube assembly. In the context of the invention, it is the layer in which the liner is placed.

An expander 14 may be used to expand liner 10 radially outwards. The expander 14 may be made of a polymer, such as but not limited to, polyethylene terephthalate (PET), but could be made of other materials. Expander 14 has an OD slightly less than the ID of tube 12, the difference between the diameters being the desired final thickness of liner 10 after its radial expansion.

Alternatively, expander 14 is not solid, but rather is a pressurized fluid (liquid or gas).

A local heat source 16, such as an induction heating ring, resistance coil heating ring, hot air nozzle, torch or others, may be used to locally heat a portion of liner 10, called a heated portion 18. The heated portion 18 is significantly shorter in length than the total length of liner 10 (not more than a third of the total length), such as but not limited to, 5%, 10% or 20% of the total length. Defined in other terms, heated portion 18 may be a few millimeters in length, or 5 mm, 10 mm, 15 mm, 20 mm, 25 mm, 28 mm, 30 mm, 35 mm, 40 mm, or other suitable lengths.

As seen in FIG. 1, liner 10 is initially placed in tube 12. Local heat source 16 heats heated portion 18 and expander 14 is introduced in liner 10. The local heat source 16 is gradually advanced longitudinally (in the direction of arrow 20) and gradually heats a local area of liner 10 and tube 12. In one option, expander 14 remains stationary inside the liner and the expander is made of a material that expands radially outwards upon reaching the heated temperature caused by the local heat source 16. (For example, expander 14 could be made of a shape memory material.) The expander 14 thus causes lubricious liner 10 to expand radially outwards, and presses the heated portion 18 of expanded liner 10 against the inner wall of tube 12. In another option, expander 14 does not expand outwards and is not stationary, but instead is gradually advanced longitudinally (in the direction of arrow 20) and gradually expands the heated portion 18 of lubricious liner 10 radially outwards and presses the heated portion 18 of expanded liner 10 against the inner wall of tube 12. In the expanded portion, the liner OD is the same as the tube ID.

The gradual heating and expansion is much more effective than heating a long length of the liner, because the gradual and expanded movement of the liner ensures there are no kinks, wrinkles or tears in the liner 10.

The temperature to which the liner is heated by local heat source 16 is a temperature which softens the liner material to facilitate its expansion, but is lower than the melting point of the tube 12. Without limitation, for one example with a PTFE liner and PEBA tube, the heated portion 18 is expanded with a pressure of 6 bar, and heated to 135° C. with a 28 mm wide heating nozzle, which linearly advances in the direction of arrow 20 at a speed of 1 mm/sec.

Reference is now made to FIGS. 2A, 2B, 2C, and 2D. One portion of the liner 10, called non-joined expanded portion 22, is expanded against the inner wall of the tube 12 without joining the tube 12 to the liner 10. Another portion of the liner 10, called joined expanded portion 24, is expanded against the inner wall of the tube 12 and the tube 12 is joined to the liner 10. The joining may be done at any temperature above the melting point of tube 12. Without limitation, for one example with a PTFE liner and PEBA tube, the heated portion 18 is expanded with a pressure of 6 bar, and heated to 160° C. with a 28 mm wide heating nozzle, which linearly advances in the direction of arrow 20 at a speed of 1 mm/sec. The 160° C. temperature melts the tube material (in this example, the PEBA material), thereby welding (adhering) the tube material to the liner material. In another example, the PTFE liner may be an inner liner with an outer layer of PEBA, and the multi-layer liner is placed inside tube 12 which is made of another material, such as nitinol. In this case, the 160° C. temperature melts the outer layer of the liner material (PEBA), thereby welding (adhering) the outer layer of the liner material to the tube material.

In accordance with a non-limiting embodiment of the present invention, the non-joined expanded portion 22 is where there are slots or other cuts 26 in the tube 12 so the tube 12 can bend in different directions; this area undergoes high deformations due to different kinds and directions of bending, which may cause plastic deformation of the liner 10 which could weaken and break or tear the liner 10. In contrast, the joined expanded portion 24 is an uncut portion of the tube 12.

The invention claimed is:

1. A method for assembling a liner in a tube comprising:
placing a liner in a tube;
heating a portion of said liner, called a heated portion, with a local heat source, said heated portion being not more than a third of a total length of said liner,
expanding said heated portion radially outwards so that said heated portion abuts against an inner wall of said tube; and
repeatedly advancing said local heat source longitudinally along a desired length of said liner and expanding said heated portion radially outwards so that said heated portion abuts against the inner wall of said tube for the desired length; and wherein a portion of said liner, called a non-joined expanded portion, is expanded against the inner wall of said tube without joining said tube to said liner.

2. The method according to claim 1, wherein said liner is made of a lubricious material.

3. The method according to claim 1, wherein the step of expanding is done by using a solid expander introduced into said liner.

4. The method according to claim 1, wherein the step of expanding is done by using a liquid expander.

5. The method according to claim 1, wherein the step of expanding is done by using a gas expander.

6. The method according to claim 1, wherein a temperature to which said liner is heated is a temperature which softens said liner, but is lower than a melting point of said tube.

7. A method for assembling a liner in a tube comprising:
placing a liner in a tube;
heating a portion of said liner, called a heated portion, with a local heat source, said heated portion being not more than a third of a total length of said liner,
expanding said heated portion radially outwards so that said heated portion abuts against an inner wall of said tube; and
repeatedly advancing said local heat source longitudinally along a desired length of said liner and expanding said heated portion radially outwards so that said heated portion abuts against the inner wall of said tube for the desired length, wherein a portion of said liner, called a joined expanded portion, is expanded against the inner wall of said tube and said tube is joined to said liner.

8. The method according to claim 7, wherein said tube is joined to said liner by heating said tube to a temperature above a melting point of said tube.

9. A method for assembling a liner in a tube comprising:
placing a liner in a tube;

heating a portion of said liner, called a heated portion, with a local heat source, said heated portion being not more than a third of a total length of said liner, expanding said heated portion radially outwards so that said heated portion abuts against an inner wall of said tube; and repeatedly advancing said local heat source longitudinally along a desired length of said liner and expanding said heated portion radially outwards so that said heated portion abuts against the inner wall of said tube for the desired length, wherein a portion of said liner, called a non-joined expanded portion, is expanded against the inner wall of said tube without joining said tube to said liner and another portion of said liner, called a joined expanded portion, is expanded against the inner wall of said tube and said tube is joined to said liner.

10. The method according to claim 9, wherein said tube is joined to said liner by heating said tube to a temperature above a melting point of said tube.

11. The method according to claim 9, wherein said non-joined expanded portion is where there are slots or other cuts in said tube and said joined expanded portion is an uncut portion of said tube.

\* \* \* \* \*